(12) United States Patent  (10) Patent No.: US 8,592,711 B2
Lambert  (45) Date of Patent: Nov. 26, 2013

(54) APPARATUS AND METHOD OF ELECTRONICALLY IMPREGNATING A WEAR-RESISTANT CUTTING EDGE

(76) Inventor: George H. Lambert, Stuart, FL (US)

(*) Notice: Subject to any disclaimer, the term of this patent is extended or adjusted under 35 U.S.C. 154(b) by 0 days.

(21) Appl. No.: 12/845,207

(22) Filed: Jul. 28, 2010

(65) Prior Publication Data

US 2011/0078909 A1  Apr. 7, 2011

Related U.S. Application Data

(60) Provisional application No. 61/247,666, filed on Oct. 1, 2009, provisional application No. 61/247,733, filed on Oct. 1, 2009.

(51) Int. Cl.
B23K 9/04 (2006.01)
B26B 9/00 (2006.01)

(52) U.S. Cl.
USPC .............................. 219/76.13; 219/77; 30/350

(58) Field of Classification Search
USPC .......... 75/236; 76/104.1; 30/345, 346.54, 350; 219/76.13; 427/402, 404, 405, 419.1, 427/419.7, 483; 428/698
See application file for complete search history.

(56) References Cited

U.S. PATENT DOCUMENTS

| | | | |
|---|---|---|---|
| 2,309,371 A | 1/1943 | Wissler | |
| 3,446,932 A | 5/1969 | Belopitov | |
| 3,451,791 A | 6/1969 | Meadows | |
| 3,666,906 A | 5/1972 | Byrne | |
| 3,681,846 A | 8/1972 | Gerber | |
| 3,762,243 A | 10/1973 | Borrkfield | |
| 3,911,579 A | 10/1975 | Lane et al. | |
| 3,932,231 A | 1/1976 | Hara et al. | |
| 4,299,860 A | 11/1981 | Schaefer et al. | |
| 4,488,882 A | 12/1984 | Dausinger et al. | |
| 4,653,373 A | 3/1987 | Gerber | |
| 4,818,839 A | 4/1989 | Chastain | |
| 4,896,424 A | 1/1990 | Walker | |
| 5,069,872 A | 12/1991 | Penoza | |
| 5,262,202 A * | 11/1993 | Garg et al. | 427/383.3 |
| 5,431,071 A | 7/1995 | Williams | |
| 5,477,616 A | 12/1995 | Williams et al. | |
| 5,697,994 A * | 12/1997 | Packer et al. | 51/309 |
| 6,067,784 A | 5/2000 | Jordan | |
| 6,086,684 A | 7/2000 | Saito et al. | |
| 6,109,138 A | 8/2000 | Upton | |
| 6,336,950 B1 * | 1/2002 | Koizumi et al. | 75/236 |
| 6,701,627 B2 | 3/2004 | Korb et al. | |
| 6,800,383 B1 | 10/2004 | Lakhotkin et al. | |
| 7,166,371 B2 | 1/2007 | Lakhotkin et al. | |
| 2006/0185254 A1 | 8/2006 | Hirai et al. | |
| 2007/0163128 A1 * | 7/2007 | Tarrerias | 30/350 |

* cited by examiner

*Primary Examiner* — Brian Jennison
(74) *Attorney, Agent, or Firm* — McHale & Slavin, P.A.

(57) ABSTRACT

An apparatus and method for treating a cutting edge with a carbide coating to form a high endurance cutting edge that is self sharpening. The cutting edge has one side of its bevel treated with an electronically impregnated coating to create a wear resistant surface employing Tungsten, Titanium or Vanadium Carbide. The coating providing an abrasion resistant cutting edge and creates a differential hardness on the total cutting edge thereby extending its cutting ability through a wear-resistant surface on its treated face and a faster wear on the untreated surface causing the cutting edge to be self sharpening.

4 Claims, 3 Drawing Sheets

APPARATUS AND METHOD OF ELECTRONICALLY IMPREGNATING A WEAR-RESISTANT CUTTING EDGE

PRIORITY claim

This application is based upon and claims the filing date of U.S. Provisional Patent Application Nos. 61/247,666, filed Oct. 1, 2009, and 61/247,733, filed Oct. 1, 2009, the contents of which are incorporated herein by reference.

FIELD OF THE INVENTION

This invention relates to metal treatment and in particular to an apparatus and method of electronically impregnating a wear-resistant cutting edge for longer endurance and self sharpening of cutting implements.

BACKGROUND OF THE INVENTION

It has long been considered desirable to provide a cutting edge which will reduce or minimize the tendency for the edge to wear or abrade off as it is used to cut and slice various substances or medians, thereby minimizing the need to re-sharpen. For this purpose, knives used for cutting and the like, such as hunting, camping, fishing, kitchen, cutlery, meat or butchering industries and/or general purpose or special purpose knives are generally unsuitable for extended use before having to be re-sharpened to continue its use as a cutting or slicing tool. Cutting edges found on lawn mower blades are frequently worn quickly causing a tearing of the grass which exposes the lawn to diseases, unless the blades are periodically re-sharpened. Cutting edges found on knives, scissors, shears, and the like are conventionally provided with a hardened blade or otherwise treated coating such as nitrating, sputtering, sintering, hot spraying, bonding or adhesion coated or other means to extend its edge holding characteristic. Consequently, it is necessary to use a sharpening method or system to re-sharpen the blade often.

The cutting edge of a blade, such as a knife blade, also has the disadvantage that it wears more rapidly and is damaged more readily, inasmuch as the area of the cutting surface due to abrasion, and wear is markedly reduced owing to the removal of metal by abrasion and also because the cutting surface constitutes a material or finish that is continuously removed. Consequently, their performance level falls more rapidly and the knives must be re-sharpened or replaced more frequently than knives having a carbide impregnated cutting edge.

Tungsten carbide and titanium carbide have been utilized as a tooling and engineering material in many industrial applications as they exhibit superior toughness and abrasion resistance given its high hardness. However, all known devices used to apply carbide or the like deposits are not available to average consumer, or involve such a complicated process that it would not be practical for the average consumer to apply such a cutting edge. What is needed in the art is apparatus and method of applying a carbide coating to cutting blade, such as a knife, scissors, lawn mover blade, lawn edger, shovel, ice scraper, or any other commonly available blade that would benefit from maintaining a sharp edge and minimize the need to re-sharpen.

U.S. Pat. No. 3,681,846 discloses the advantages of tungsten carbide for use with reciprocating knife blades. In this disclosure a knife blade having outer layers of a relatively soft carrier material, such as steel or aluminum, and an inner layer of relatively hard material such as tungsten carbide. The inner layer may be deposited on one or the other, or both outer layers, or may be bonded thereto as a separate member, or may be inserted in cavities defined by these outer layers of carrier material. When assembled, the thickness of the harder inner layer varies in the longitudinal direction so that when the longitudinally extending cutting edge is used to cut in a reciprocating action, said edge will wear away in an uneven fashion producing a serrated edge which need not be sharpened as frequently as a conventional knife blade.

U.S. Pat. No. 3,762,243 discloses a method of making sharp-edged cutting elements in which one of two opposite surfaces of a work piece has a thin layer added thereto.

U.S. Pat. No. 3,666,906 discloses a carbide deposition structure which includes a carbide electrode and workpiece, a low voltage, low frequency oscillator operably associated with the switch for turning the switch on and off and a high frequency, high voltage oscillator for initiating an arc between the electrode and workpiece.

U.S. Pat. No. 3,446,932 discloses a method and apparatus for the coating of a substrate with conductive material wherein a pendulously supported coating electrode disk carried by an oscillation-damped arm bears against substrate resiliently supported at two spaced-apart locations (e.g. a continuous tensioned band or endless conveyor carrying a number of bodies). A discharge is generated between the disk, which may have a continuous or discontinuous surface and the substrate while the disk is rotated in contact with the substrate. The discharge also serves to carry portions of the electrode disk material onto the substrate.

U.S. Pat. No. 3,911,579 discloses an improved razor blade and methods of making the same wherein the cutting edge formed by two intersecting surfaces is sputter deposited with a refractory material which is subsequently overlaid with a sputter deposited coating of material displaying adhesion to a final lubricious coating.

U.S. Pat. No. 4,653,373 discloses a knife blade that has a cutting portion which includes two adjoining faces defining a cutting edge and comprises a relatively soft or high wear base material and a relatively hard or low wear coating. One of the faces is formed by the relatively hard coating and the other face is formed by the relatively soft base material.

U.S. Pat. No. 4,299,860 discloses a method of impregnating the surface of a metal substrate with wear resistant particles to impart wear resisting characteristics to the surface. The substrate surface is subjected to a relatively moving high-powered laser beam to cause localized surface melting in passes there across, and hard wear resistant particles injected into the melt.

U.S. Pat. No. 3,932,231 discloses surface-coated cemented carbide articles. This method comprises providing a 3-50% by weight dispersion of fine powders of 20 microns or less containing 50% or more of titanium carbide in a liquid consisting mainly of an organic solvent, applying a DC voltage of 10-500 volts to the surface of tungsten carbide base cemented carbides containing 4-30% of a binder metal in said dispersion to thus cause electrophoretic deposition of the fine powders thereon, heating the coated surface at a temperature of 1260-1550 degree C. in vacuum or in a reducing or inert atmosphere and thereby forming a coating layer consisting mainly of titanium carbide of 100 microns or less on the surface of the cemented carbides.

U.S. Patent No. 2006/0185254 discloses a diamond cutting-edge material and a manufacturing method thereof in that the diamond particles thinly coat with a metallic thin film compared to the conventional Nickel (NI) coating, and thus the present invention provides an edge including a plurality of diamond particles having a 100 um or less diameter at least partially coated with Titanium.

U.S. Pat. No. 6,701,627 discloses a utility knife blade that involves joining a tool steel wire to a front edge of an alloy steel backing strip. The composite strip is then annealed, and the annealed strip is straightened to eliminate any camber therein.

U.S. Pat. No. 6,800,383 discloses a tungsten carbide alloyed with fluorine in amounts up to 0.5 wt % and possibly with fluorocarbon compositions by chemical vapor deposition, in which tungsten hexafluoride, hydrogen and a carbon-containing gas are used. The tungsten carbide coatings are deposited on construction materials and items made from them.

U.S. Pat. No. 7,166,371 discloses a cutting tool having a blade coated on one side with a hard coating living a laminar or layered microstructure. The coating includes at least one layer made of tungsten carbides substantially or entirely free of metallic tungsten.

U.S. Pat. No. 6,336,950 discloses an electrode rod for spark alloying of high melting compounds such as carbide and boride.

U.S. Pat. Nos. 5,477,616 and 5,431,071 disclose knife blades and methods of production by providing a knife blade with a cutting edge having a harder material than the body of the blade comprising a v-shaped cutting edge formed on a blank, and such that the cutting tip lies substantially central of the width of the blank with a coating of a material harder than the material of the blank.

U.S. Pat. No. 6,109,138 discloses a knife blade including a cutting edge formed on a blank. One side of the edge is provided with a coating formed by a particulate material in a matrix. The matrix is softer than the particulate material, and the coating is such that a considerable number of the particulates project from the matrix thereby defining a cutting tip on the cutting edge. The coating is cemented carbide such as tungsten carbide. The coating is provided by high pressure velocity oxy-fuel.

U.S. Pat. No. 4,896,424 discloses a composite cutting blade for a knife or other cutting instrument. The blade is formed from a body section made of a strong tough material formed with a dovetail configuration along one edge thereof and a cutting edge section made of a hard durable material that has a matching dovetail configuration along one edge. In one embodiment the body is titanium and the cutting edge is high carbon stainless steel.

U.S. Pat. No. 4,488,882 discloses a method of embedding tungsten carbide particles on an edge of a cutting tool such as a saw blade, a drill, or the like. The cutting edge is partially melted by an energy beam, for example a laser beam, or an electron beam. A laser beam is preferred since, then, the process can be carried out in air, or in a protective gas atmosphere, rather than in a vacuum. The beam partially melts the cutting edge and the granules of the hard metal particles, such as tungsten carbide.

U.S. Pat. No. 6,067,784 discloses a hard facing for an agricultural machine blade which contains tungsten carbide of 40 to 100 um in particle size and a hardness of greater than 1400 HV in a matrix with hardness of 500 to 800 HV.

U.S. Pat. No. 6,086,684 discloses an electric discharge surface treating method providing a nitriding treatment, performed on a coated layer.

What is needed is an apparatus and method that allows the average consumer to impregnate tungsten and titanium carbides to permit high endurance cutting performance from most any cutting edge.

SUMMARY OF THE INVENTION

Disclosed is an apparatus and method for treating a cutting edge, such as a handheld metal knife. The cutting edge having one side of its bevel treated with an electronically impregnated coating to create a wear resistant surface by impregnation of the base material with an alloy such as tungsten, titanium or vanadium carbide. The coating provides an abrasion resistant cutting edge and creates a differential hardness on the total cutting edge, thereby extending its cutting ability through a wear-resistant surface on its treated face and a faster wear on the untreated surface. This differential in hardness will cause the cutting edge to be self sharpening.

It is an objective of this invention to provide an ordinary, or everyday use, handheld knife with a wear-resistant cutting surface on one edge side of the blade, which satisfies the need for a knife to be suitable for extended use and which also has high wear-ability and durability.

Another objective of this invention is to provide a knife having a cutting edge surface that has anti-wear characteristics while cutting/slicing the surface of the work upon use.

Yet another objective of this invention is to provide a cutting edge that eliminates the wear and durability problems of conventional cutting edges used on knives and the like, and to further provide increased wear resistance over current processes.

Another objective of the invention is to disclose a process to provide the designer and maker of knives with an economical, simple to apply improvement to the cutting edge of any knife design for edge holding and cutting reliability.

Still another objective of this invention is to provide in a handheld knife, including a blade and cutting edge having a cutting face, a layer of tungsten carbide, titanium carbide, and vanadium carbide or other hard material/compound electrodeposited on one side of the bevel forming an outer surface on the cutting edge and penetrating the cutting edge, thereby providing an anti-abrasion and wear-resistant surface on the knife edge.

An additional objective is to provide a cutting edge which accomplishes the foregoing objects which is readily and economically applied, requiring a very simple operation on an otherwise finished cutting or handheld knife tool that does not require expensive tools or processes.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE PREFERRED EMBODIMENT

Figure 1:
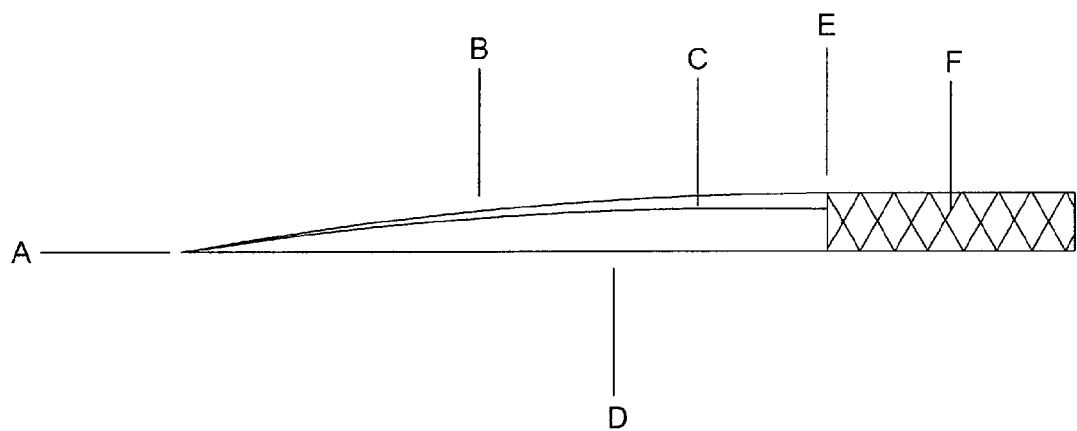
FIG. 1 is a pictorial view of a conventional knife blade.

While the disclosed invention can be used on any type of cutting edge, to simplify the disclosure a knife blade is illustrated. Now referring to FIG. 1, set forth is a pictorial of a knife blade with each edge defined. In particular, the knife blade illustrated is a shank or blade (10) having a point (A). The edge (B) of the blade is defined as the sharpened side that extends from the point to the ricasso (E). The bevel (C) is the sloping area that falls from the spine of the blade towards the edge (B). The bevel (C) is angled from 10-25 degrees. The back (D) of the blade is the opposite side of the edge (B). The ricasso (E) is the flat section of the blade between the tang (F) and the start of the bevel (C) and the tang (F) is the protrusion of the blade in the handle of a conventional knife.

Figure 2:
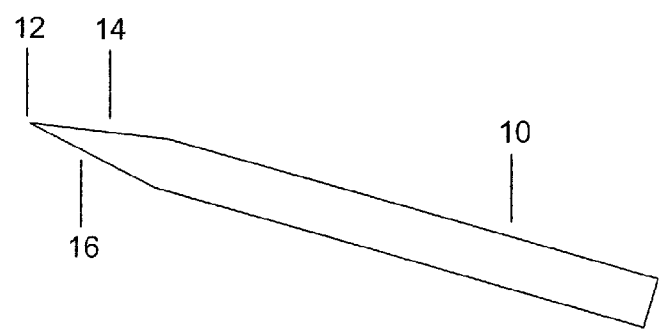
FIG. 2 is a pictorial illustration of a cutting edge.

Referring now to FIG. 2, the instant invention is based upon creating a zone of differential in edge hardness wherein a blade (10) has a cutting edge (12) defined by a first bevel (14) having a tungsten carbide, titanium carbide, tungsten/titanium carbide, or vanadium carbide treated surface and a second bevel (16) which is untreated and remains the original base blade material.

The main components of this invention include: Cutting edge (12); Blade (10) formed from titanium alloy material or other metal alloys; Electronic Spark Impregnation device for deposition of Tungsten Carbide, Titanium Carbide, Vanadium Carbide or other hard material/compound by use of an electrode; Applicator tool for holding of the electrode and guiding of the blade (10).

Bevel designed to layout treatment area; Approximate ⅛ inch from cutting edge (B) back to spine of Blade (10); Bevel (14) angle approximately 1-30 degrees (+ or −) each blade side; Treat only the first bevel (14) creating a differential hardness with the second bevel (16); Coating the first bevel (14) with a thickness between 0.00001 and 0.0010 ten-thousandths; Coating density maximum (no space left between applied spots).

This invention is a product by process which means that equipment, tools, materials, settings, specifications, blade geometry and measurements are required that are unique in their combination that results in a cutting edge, such as a handheld knife-edge, having a wear and abrasion resistant finish that is applied.

Figure 3:
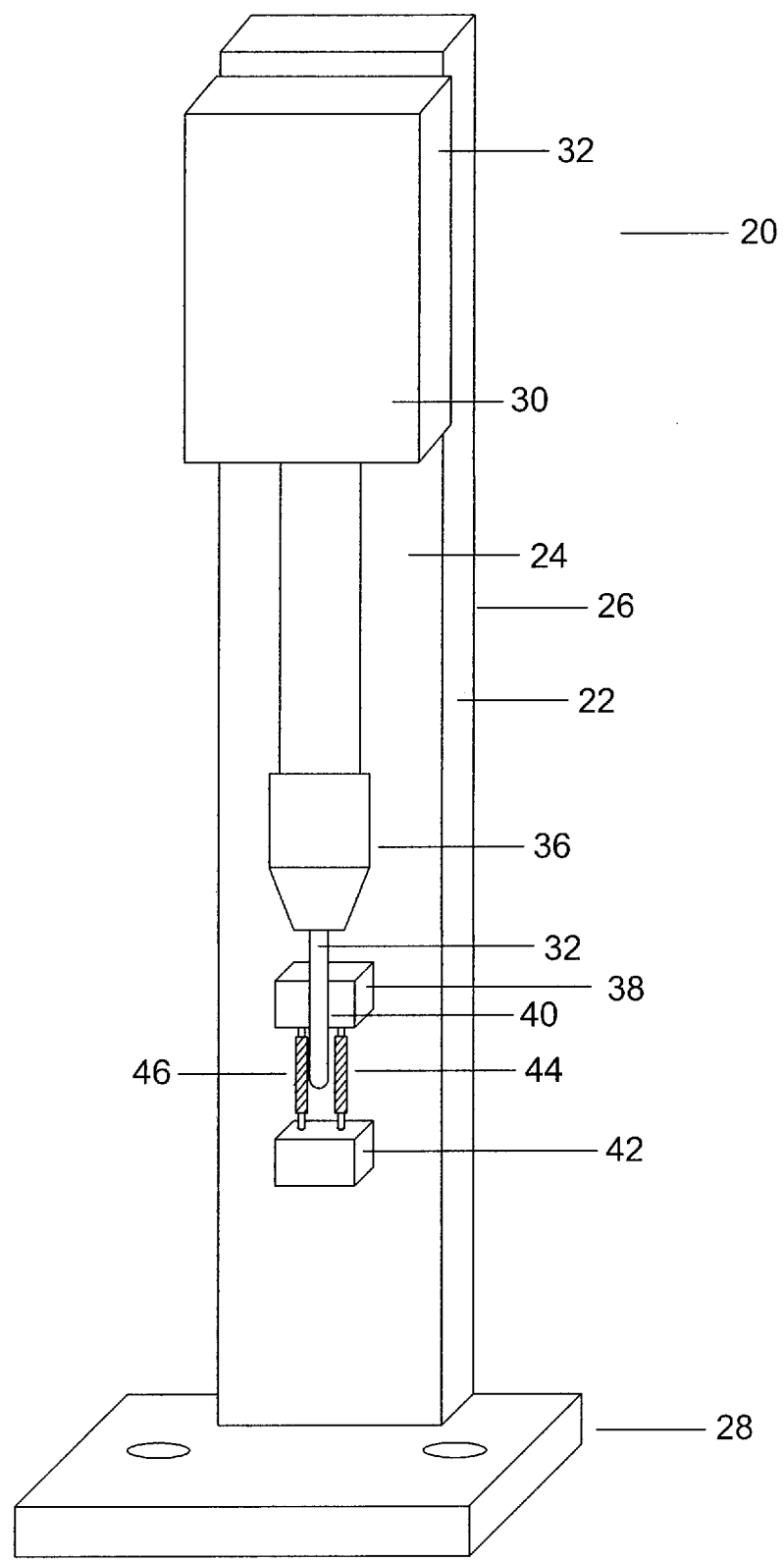
FIG. 3 is a plane view of a tool post gun.

FIG. 3 depicts a tool post gun which includes a mounting assembly to keep the user from coating other than the necessary edge bevel. The tool jig controls the area of Tungsten/Titanium Carbide applied by indexing the cutting edge (B) of the blade against a mechanical stop such as metal rollers or guides while the electrode diameter creates the other limit to control the width of Tungsten Carbide/Titanium Carbide and not exceed the width of bevel. While the electrode is preferably round and hollow, oval, triangular, square, rectangular or most any shape will suffice. Round electrodes are the most commonly available but not necessarily the only type of electrode shape that could be used. Further, it has been found that a hollow electrode provides an even deposition of material when used in combination with the guide rails as the coating is deposited from around the edges of the electrode, eliminating a build up deposit which can occur with a solid electrode. Electrode rod sizes may vary and can be used for different sized blades, for instance, 3/32, 3/16, ⅛ are all suitable sizes. Further, in this technique the tool post does not require adjustment, rather the deposition amount is controlled by the amount of electrical current requested by the blade owner.

The benefit of the technique and tool will insure proper contact and consistent coating of the knife edge bevel along with the proper instructions to insure satisfactory and consistent results. Any attempt to apply by hand the edge material by spark deposition would be uneven as it may be possible to hold a tool by hand during the electrical pulsing, but it is less controllable.

The process of applying the edge material is by spark deposition process of impregnation Tungsten Carbide and/or Titanium Carbide to a Titanium Alloy or other metal alloy blade of various construction, material and design. The Electronic Charge Generator electronically applies electrode material by a spark deposition process. Material is impregnated both underneath and on top of the cutting edge bevel surface. Movement of the bevel across the electrode should provide proper coating at the rate of 30 seconds per inch.

The tool post gun (20) comprises a rigid rectangular shaped base (22) defined by a front surface (24) and a rear surface (26). A support stand (28) is attached to an end of base allowing the base to be placed in a vertical position, as well as in the horizontal plane. The electrode holder (30) is powered by a charged generator and used to hold the electrode (32) and provide a vibrating movement and pulsating current to cause the deposition of the electrode onto the item to be coated. Chuck (36) holds the electrode in position, the chuck providing ease of replacing worn electrodes. The electrode can be of most any shape and various types of chucks may be used and remain within the scope of this invention. The preferred embodiment employs a hollow and round electrode found to provide the most uniform deposits. The electrode 32 may also be a brush or roller, or other design. The vibrator can also be an electronic device that electrically makes and breaks contact.

The support base includes a first guide post (38) that is generally U-shaped, allowing positioning of the electrode (32) within the center (40) of the guide post. Alternatively, the guide post may consist of an aperture for insertion of the electrode, a separated spilt post being placed on either side of the electrode, or an edge post that is positioned on one side of the electrode. The purpose of the guide post is to hold a guide rail that is used for proper positioning of the work piece to be coated. The guide post is constructed and arranged to position the electrode at a predetermined distance from the edge of the work piece to be coated, the coating being optimized to treat one bevel of a cutting edge wherein one bevel remains untreated. In the preferred embodiment, a second guide post (42) is spaced apart from the first guide post in that at least one guide rail (44) and preferably a second guide rail (46) are placed between the first and second guide post in parallel with the electrode. The guide rail, or guide rollers, allow for transfer of the work piece across the end of the electrode and allows a guide to prevent movement of the blade due to the pulsating current. Further, the position of the guide assures the carbide deposit is directed to the bevel of the blade versus the edge of the blade. The guide rails are placed in a fixed position and the charged generator altered so as to increase or decrease the amount of the electrode deposit on the bevel. The guide rails (44) and (46) are preferably made out of a carbide material which is at least as strong as the carbide to be deposited upon the blade bevel so as to prevent premature wearing of the guide rails when a treated blade is drawn across the rails.

Figure 4A:
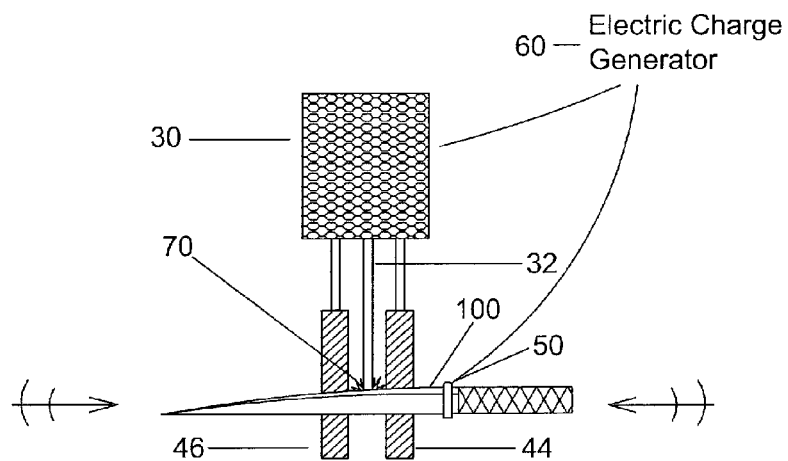
FIG. 4a is a pictorial illustration of a tool post.
Figure 4B:
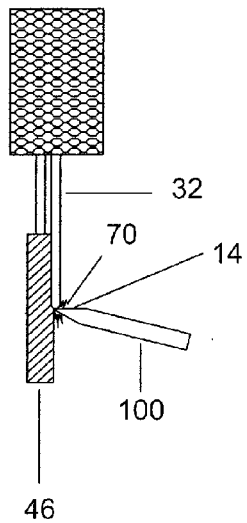
FIG. 4b is a pictorial side view of the tool post.
Figure 4C:
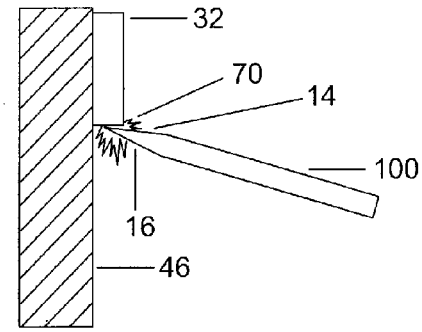
FIG. 4c is an enlarged pictorial view of the cutting edge deposit.

FIG. 4(a) provides a pictorial illustration illustrating the tool post holder (30) and electrode (32) placed in a position over the first guide rail (44) and a second guide rail (46). The knife (100) is drawn along the guide rails (44) and (46) with power directed from the charge generator (60) and delivered to the electrode (32) in a vibrating motion wherein an electrical contact is made between the charge generator (60) and the knife (100) preferably by coupling a grounding cable to the knife (100) with a flexible strap (50) or alternatively by grounding the guide rails (44) and (46) wherein a positive contact between the work piece and the guide rails provides a proper ground. FIG. 4(b) is a side view of the guide post set forth in FIG. 4(a) illustrating the guide rail (46) and the electrode (32) with the knife (100) being drawn across the guide rail (46), electrode deposit is placed upon the first bevel (14) at an amount dependant upon the angle and speed that the knife is drawn past the electrode. FIG. 4(c) is an enlarged view further highlighting how the knife (100) includes a bevel (14) that is placed along the end of the carbide electrode (32) having a contact point (70) for depositing the carbide onto the first bevel (14) of the knife. It is important to note that only one side of the knife blade is coated which allows for self-sharpening during use wherein excess wear causes removal of the uncoated bevel (16) so as to maintain a sharp edge between the uncoated and coated bevel edges.

A limitation to the amount of deposit selected is of critical importance to insure no appreciable heat is generated which would affect the temper and hardness of the blade material and subsequently the edge bevel thereby making the edge brittle and virtually useless. In addition, this limitation is required to keep the build-up of electrode material to a minimum which tends to cause overheating, and a blotched or splattered finish which will result in a duller or rounded final cutting edge In the preferred embodiment, the deposit setting should be applied at the following specifications;

| Thousandths of an inch | Bevel or Blade Angle |
|---|---|
| 0.0002-0.0003 | 10-15 degrees |
| 0.0003-0.0004 | 15-20 degrees |
| 0.0004-0.0005 | 20-25 degrees |

This may be accomplished during a single pass or through multiple passes or layers of deposited electrode material of tungsten carbide, titanium carbide or vanadium carbide.

The figures in general illustrate the placement of a knife blade along the electrode end, the electrode driven by use of Spark Deposition Equipment with certain modifications to limit the amount of coating in thickness and area of application. Preferred equipment used to achieve the "Spark Deposition by Electronic Discharge" methodology is the 380 or 800 Rocklinizer manufactured by Rocklin Manufacturing Company. In operation the Electronic Charge Generator is set to the correct discharge setting. The power lead is clamped to the knife blade or the guide rails/rollers could be grounded. The cutting edge of the knife blade is positioned against the metal guides, preferable the starting point is at the Ricasso and the knife drawn across the guides to the point. The coating is applied evenly from the edge (B) to the back of the bevel (C) with a slight rotating movement from cutting edge to the end of the bevel as it changes into the blade side. A magnifying glass will provide visual examination and surface when, the electronic discharge/sparking has virtually reduced to a minimum then the process is complete.

The instant invention allows the average consumer to treat the edges of blades to provide better greater efficiency in operation and for increasing the longevity of the workpiece. For instance, when a lawn mover blade is properly sharpened, the lawn is cut at a precise angle eliminating the tearing of the grass and saving fuel as the engine need not work as hard to accomplish the same goal. Similarly, an ice scraper is placed under extreme stress when drawn over a cement surface, the immediate dulling of the blade leads to a higher workload by the individual tasked in removing the ice. Another example is the filleting of fish, a dull knife resulting in tearing of the fish flesh causing a higher workload and lessens the ability to properly harvest all the fish.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A self sharpening cutting edge formed from the process of:
    shaping a titanium alloy shank having a Rockwell C hardness less than 65 to include a first bevel extending from a spine tapering to a distal end along a first side of said shank to an edge and a second bevel extending from said edge to a spine along a second side of said shank;
    drawing said first bevel of said metal shank along a spark deposition tool post coupled to an electronic charge generator, said spark deposition tool post having at least one carbide guide constructed and arranged to maintain spacing of said first bevel a distance from an electrode,
    depositing a layer of carbide based electrode material from said electrode on said first bevel by pulsed electric discharge from said spark generation tool post so that said layer is a titanium alloy, said layer of electrode material having a material deposit of about 0.0002-0.0003 inches when said first bevel has an angle of between 10-15 degrees, said layer of electrode having a material deposit of about 0.0003-0.0004 inches when said first bevel has an angle of between 15-20 degrees, said layer of electrode material having a material deposit of about 0.0004-0.0005 inches when said first bevel has an angle of between 20-25 degrees,
    controlling said material deposit by an amount of electrical current directed to said spark deposition tool post layer at said rate of application forming a zone of differential between said first bevel and said second bevel;
    wherein said zone of differential wears before said first bevel allowing said edge to remain sharp.

2. The self sharpening cutting edge according to claim 1 wherein said carbide based electrode is tungsten carbide.

3. The self sharpening cutting edge according to claim 1 wherein said carbide based electrode is titanium carbide.

4. The self sharpening cutting edge according to claim 1 wherein said carbide based electrode is vanadium carbide.

\* \* \* \* \*